(12) United States Patent
Oi et al.

(10) Patent No.: US 7,543,444 B2
(45) Date of Patent: Jun. 9, 2009

(54) AIR SUPPLY APPARATUS

(75) Inventors: Yasuhiro Oi, Numazu (JP); Takayuki Demura, Mishima (JP); Kaoru Otsuka, Mishima (JP); Yoshito Aibara, Kobe (JP); Junya Nishimura, Kobe (JP)

(73) Assignees: Toyota Jidosha Kabushiki Kaisha, Toyota-shi (JP); Fujitsu Ten Limited, Kobe-shi (JP)

( * ) Notice: Subject to any disclaimer, the term of this patent is extended or adjusted under 35 U.S.C. 154(b) by 86 days.

(21) Appl. No.: 11/452,310

(22) Filed: Jun. 14, 2006

(65) Prior Publication Data

US 2006/0283179 A1 Dec. 21, 2006

(30) Foreign Application Priority Data

Jun. 15, 2005 (JP) ............................. 2005-174911
Jun. 7, 2006 (JP) ............................. 2006-158337

(51) Int. Cl.
*F01N 3/00* (2006.01)
(52) U.S. Cl. .................. 60/289; 60/285; 60/290; 60/293
(58) Field of Classification Search ............. 60/274, 60/285, 289, 290, 293, 299
See application file for complete search history.

(56) References Cited

U.S. PATENT DOCUMENTS

| 4,134,262 | A | * | 1/1979 | Sugihara et al. ............... 60/289 |
| 5,388,402 | A | * | 2/1995 | Aoki et al. .................... 60/276 |
| 5,404,717 | A | * | 4/1995 | Nogi et al. .................... 60/274 |
| 5,499,502 | A | * | 3/1996 | Haniu et al. .................. 60/290 |
| 5,735,121 | A | * | 4/1998 | Kato et al. .................... 60/277 |
| 6,192,678 | B1 | * | 2/2001 | Tachibana .................... 60/289 |
| 6,918,245 | B2 | * | 7/2005 | Hirooka et al. ............... 60/289 |
| 7,140,177 | B2 | * | 11/2006 | Koyama et al. ............... 60/289 |

FOREIGN PATENT DOCUMENTS

| JP | 61-113913 | 7/1986 |
| JP | 05-86848 | 4/1993 |
| JP | 05-163937 | 6/1993 |
| JP | 07-91236 | 4/1995 |
| JP | 11-229861 | 8/1999 |
| JP | 2003-336521 | 11/2003 |

\* cited by examiner

*Primary Examiner*—Binh Q Tran
(74) *Attorney, Agent, or Firm*—Kenyon & Kenyon LLP

(57) ABSTRACT

There is provided an air supply apparatus for an engine comprising a plurality of exhaust pipes and catalysts arranged in the exhaust pipes, respectively, the apparatus comprising devices for supplying air into the interior of the corresponding exhaust pipes upstream of the corresponding catalysts, respectively.

3 Claims, 5 Drawing Sheets

AIR SUPPLY APPARATUS

BACKGROUND OF THE INVENTION

1. Field of the Invention

The invention relates to an air supply apparatus.

2. Description of the Related Art

JP Unexamined Patent Publication (Kokai) No. 2003-336521 discloses an apparatus for warming up a catalyst of an engine. The engine disclosed in the above-mentioned publication comprises two exhaust pipes, and a catalyst is arranged in each exhaust pipe. Further, air is supplied to the catalysts from an air pump in order to increase the temperatures of the catalysts. In the catalysts, a hydrocarbon included in an exhaust gas burns by reacting with the air supplied from the air pump to the catalysts. Thereby, the temperature of each catalyst is increased.

In this connection, it is not preferred to employ a large air pump as the air pump for supplying the air to the catalysts. However, when a small air pump is employed in order to supply the air to a plurality of catalysts, the amount of air supplied by the air pump is insufficient to increase the temperature of each catalyst.

The object of the invention is to provide an air supply apparatus which can supply a large amount of air to the exhaust pipes.

SUMMARY OF THE INVENTION

According to the first aspect of the invention, there is provided an air supply apparatus for an engine comprising a plurality of exhaust pipes and catalysts arranged in the exhaust pipes, respectively, the apparatus comprising devices for supplying an air into an interior of the corresponding exhaust pipes upstream of the corresponding catalysts, respectively.

According to the second aspect of the invention, the air supply devices can be independently controlled.

According to the third aspect of the invention, each air supply device comprises an electrically-activated air pump, an air flow control valve and a check valve, the air pumps can be independently controlled and the air flow control valves can be independently controlled.

According to the fourth aspect of the invention, each air supply device comprises at least one electrically-activated air pump, and when a plurality of the air pumps must be activated, the air pumps are activated at different times.

According to the fifth aspect of the invention, when a plurality of the air pumps must be activated, at least one of the air pumps is activated and when a predetermined time period has elapsed after the at least one air pump is activated, the remaining air pumps are activated.

According to the sixth aspect of the invention, the apparatus comprises a battery for activating the air pumps, and when a plurality of the air pumps must be activated, at least one of the air pumps is activated and when the battery can supply an electrical power having a predetermined electrical voltage to the remaining air pumps after the at least one air pump is activated, the remaining air pumps are activated.

According to the seventh aspect of the invention, there is provided an air supply apparatus for an engine comprising a plurality of cylinder groups, each having a plurality of cylinders, a plurality of exhaust pipes connected to the cylinder groups, respectively, and catalysts arranged in the exhaust pipes, respectively, the apparatus comprising devices for supplying air into an interior of the corresponding exhaust pipes upstream of the corresponding catalysts, respectively.

According to the eighth aspect of the invention, the engine is a V-type engine comprising a plurality of banks, and the cylinder groups are provided in the banks, respectively.

According to the ninth aspect of the invention, the air supply devices can be independently controlled.

According to the tenth aspect of the invention, each air supply device comprises an electrically-activated air pump, an air flow control valve and a check valve, the air pumps can be independently controlled and the air flow control valves can be independently controlled.

According to the eleventh aspect of the invention, each air supply device comprises at least one electrically-activated air pump, and when a plurality of the air pumps must be activated, the air pumps are activated at different times.

According to the twelfth aspect of the invention, when a plurality of the air pumps must be activated, at least one of the air pumps is activated and when a predetermined time period has elapsed after the at least one air pump is activated, the remaining air pumps are activated.

According to the thirteenth aspect of the invention, the apparatus comprises a battery for activating the air pumps and, when a plurality of the air pumps must be activated, at least one of the air pumps is activated and when the battery can supply electrical power having a predetermined electrical voltage to the remaining air pumps after the at least one air pump is activated, the remaining air pumps are activated.

According to the fourteenth aspect of the invention, there is provided an air supply control apparatus of an engine for supplying an air into interiors of exhaust pipes in which catalysts are arranged, respectively, the apparatus comprising an air supply control device for controlling air supply devices for supplying an air into interiors of the corresponding exhaust pipes upstream of the corresponding catalysts, respectively, the air supply control device can control the air supply devices independently to activate the air supply devices to supply an air into the corresponding exhaust pipes upstream of the corresponding catalysts.

According to the fifteenth aspect of the invention, there is provided a method of controlling air supply devices of an engine for supplying an air into interiors of exhaust pipes upstream of corresponding catalysts which are arranged in the exhaust pipes, respectively, comprising: controlling the air supply devices independently to activate the air supply devices to supply an air into the interiors of the corresponding exhaust pipes upstream of the corresponding catalysts.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
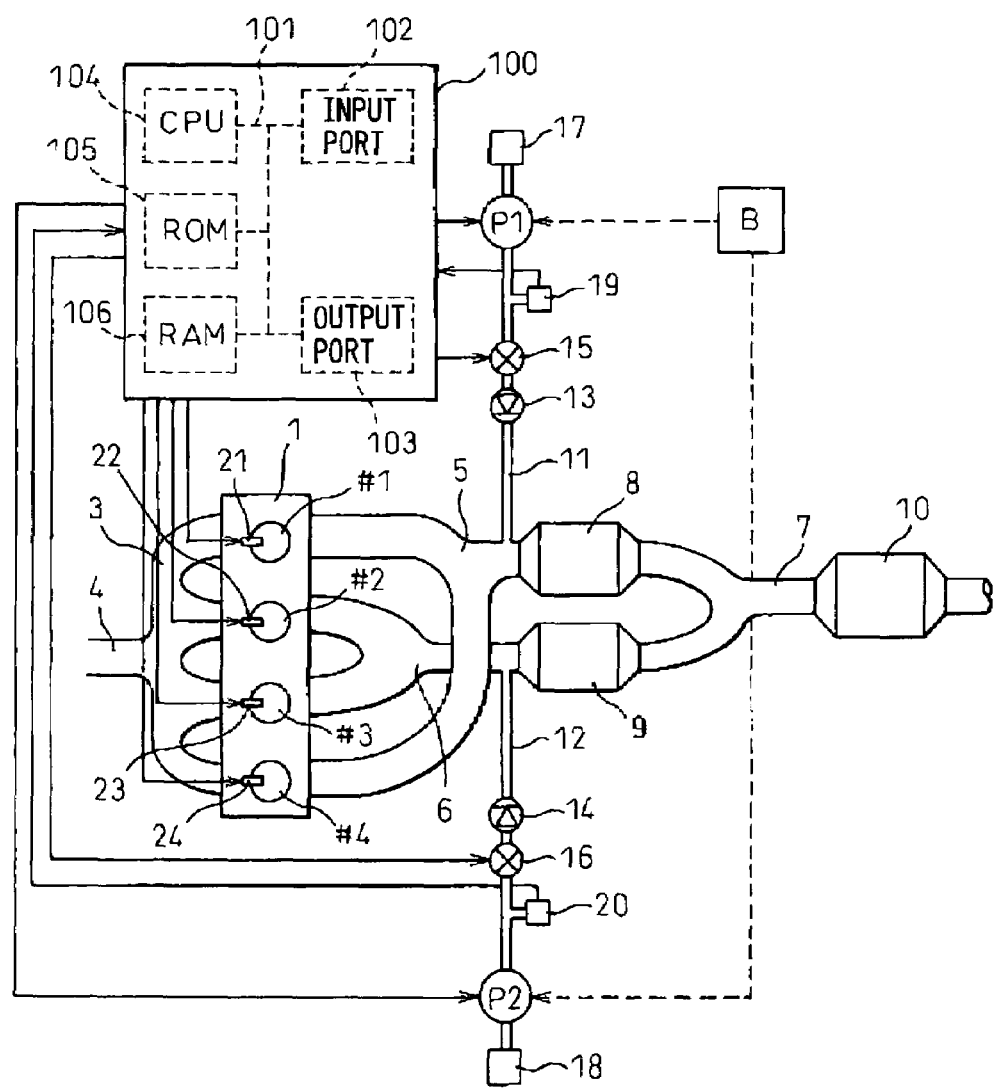
FIG. 1 is a view of an engine provided with an air supply apparatus of the invention.

The embodiments of the invention will be explained by referring to the drawings. FIG. 1 shows an engine provided with an air supply apparatus of the invention. In FIG. 1, 1 denotes a body of the engine, and #1, #2, #3 and #4 denote first, second, third and fourth cylinders, respectively. Fuel injectors 21, 22, 23 and 24 are provided to the cylinders, respectively. The cylinders are connected to an intake pipe 4 via intake branch pipes 3, respectively. The first and fourth cylinders are connected to a first exhaust branch pipe 5. The second and third cylinders are connected to a second exhaust pipe 6. That is, when the group of the first and fourth cylinders is referred to as a—first cylinder group—and the group of the second and third cylinders is referred to as a—second cylinder group, the first cylinder group is connected to the first exhaust branch pipe 5 and the second cylinder group is connected to the second exhaust branch pipe 6. The first and second exhaust branch pipes 5 and 6 are connected to a common exhaust pipe 7.

The first exhaust branch pipe 5 forms a single pipe (hereinafter referred to as a—single pipe portion—) at its downstream area and is divided into two pipes (hereinafter referred to as—divided pipe portions—) at its upstream area. The divided pipe portions of the first exhaust branch pipe 5 are connected to the first and fourth cylinders, respectively. Similarly, the second exhaust branch pipe 6 forms a single pipe (hereinafter referred to as a—single pipe portion—) at its downstream area and is divided into two pipes (hereinafter referred to as—divided pipe portions—). The divided pipe portions of the second exhaust branch pipe 6 are connected to the second and third cylinders, respectively.

Three-way catalysts 8 and 9 are arranged in the single pipe portions of the exhaust branch pipes 5 and 6, respectively. A catalyst 10 for purifying specific components included in an exhaust gas is arranged in the exhaust pipe 7. Three-way catalysts 8 and 9 purify nitrogen oxide (NOx), carbon monoxide (CO) and hydrocarbon (HC) at high purification ratio when the temperature of the catalyst is higher than a certain temperature, i.e. the activation temperature, and the air-fuel ratio of the exhaust gas flowing into the catalyst is around the stoichiometric air-fuel ratio.

The catalyst 10 positioned downstream of the three-way catalysts 8 and 9 may be a NOx catalyst for purifying NOx. The NOx catalyst carries NOx by absorbing or storing the NOx when the temperature of the NOx catalyst is higher than a certain temperature, i.e. the activation temperature and the air-fuel ratio of the exhaust gas flowing into the NOx catalyst is greater (i.e. leaner) than the stoichiometric air-fuel ratio. On the other hand, the NOx catalyst reduces and purifies the NOx when the temperature of the NOx catalyst is higher than the activation temperature and the air-fuel ratio of the exhaust gas flowing into the NOx catalyst is the stoichiometric air-fuel ratio or smaller (richer) than the stoichiometric air-fuel ratio.

Air pipes 11 and 12 are connected to the single pipe portions of the exhaust branch pipes 5 and 6 upstream of the three-way catalysts 8 and 9, respectively. In the direction away from the single pipe portions, check valves 13 and 14, air flow control valves 15 and 16, air pumps P1 and P2 and air filters 17 and 18 are arranged in the air pipes 11 and 12, respectively. Pressure sensors 19 and 20 for detecting the pressure of the air in the air pipes 11 and 12 are arranged in the air pipes 11 and 12 between the air flow control valves 15 and 16 and the air pumps P1 and P2, respectively. A common battery B supplies an electrical power to the air pumps P1 and P2 to activate them. Therefore, in this embodiment, electrically-activated air pumps are employed as the air pumps.

The air pumps P1 and P2 take in air through the air filters 17 and 18 and discharge the air toward the single pipe portions of the exhaust branch pipes 5 and 6. Further, the air pumps P1 and P2 can be independently controlled. The air flow control valves 15 and 16 control the supply of the air discharged by the air pumps P1 and P2 to the single pipe portions of the exhaust branch pipes 5 and 6. When the air flow control valves 15 and 16 are opened, the air is supplied to the single pipe portions of the exhaust branch pipes 5 and 6 from the air pumps P1 and P2. On the other hand, when the air flow control valves 15 and 16 are closed, the supply of the air to the single pipe portions of the exhaust branch pipes 5 and 6 from the air pumps P1 and P2 is stopped. The check valves 13 and 14 prevent the air from flowing from the exhaust branch pipes 5 and 6 to the air pumps P1 and P2.

In the first embodiment, the air pumps P1 and P2 can be independently controlled and are provided for the three-way catalysts 8 and 9, respectively, and thus the air can be supplied to the three-way catalyst 8 and 9, respectively, so as to satisfy the various requirements relating to the three-way catalysts 8 and 9.

In FIG. 1, an electronic control unit (ECU) 100 comprises an input port 102, an output port 103, CPU (microprocessor) 104, ROM (read only memory) 105 and RAM (random access memory) 106, which are connected each other by a bidirectional bus 101. The pressure sensors 19 and 20 are connected to the input port 102 and the outputs of the pressure sensors 19 and 20 are input into the input port 102. The output port 103 is connected to the air flow control valves 15 and 16, fuel injectors 21-24 and the air pumps P1 and P2.

In the first embodiment, when both of the air pumps P1 and P2 must be activated, first, one of the air pumps P1 and P2, for example, the air pump P1 is activated and the other air pump, i.e. the air pump P2 is not activated. Then, when a predetermined time period has elapsed after the air pump P1 is activated, the air pump P2 is activated. That is, in the first embodiment, when both of the air pumps P1 and P2 must be activated, they are activated at different times.

The activation of the air pumps according to the first embodiment is advantageous. In particular, in the case wherein the common battery B supplies an electrical power to the air pumps P1 and P2, if both of the air pumps P1 and P2 are activated simultaneously, the electrical voltage which the battery B can supply to the air pumps is largely decreased. Such a large decrease in the electrical voltage of the battery B is not preferred as the electrical power of the battery B is generally also used to energize the lamps and the audio system of the automotive vehicle. On the other hand, when the air pumps P1 and P2 are activated at the different times, the electrical voltage of the battery is not largely decreased.

In the first embodiment, when the temperatures of the three-way catalysts 8 and 9 are lower than a predetermined temperature (in particular, an activation temperature at which the three-way catalyst can purify the NOx, CO and HC), for example, at engine starting, it is judged that both of the air pumps P1 and P2 must be activated. In other words, when the engine is driven and the air is supplied from the air pumps to the three-way catalysts (at this time, the air flow control valves 15 and 16 are opened), the HC included in the exhaust gas burns with the supplied air in the three-way catalysts to increase the temperatures of the three-way catalysts. Therefore, when the temperatures of the three-way catalysts are lower than the activation temperature and air is supplied from the air pumps to the three-way catalysts, the temperatures of the three-way catalysts are increased to the activation temperature.

Further, in the first embodiment, the above-mentioned predetermined time period between the activation of the first air pump P1 and the activation of the second air pump P2 may be determined on the basis of the voltage of the battery B and/or the temperature of the cooling water for cooling the engine and/or the temperature of the ambient air. In particular, when the voltage of the battery B is smaller than the standard voltage, the activation of the second air pump P2 should be delayed until the voltage of the battery B becomes the standard voltage. Therefore, in the case wherein the above-mentioned predetermined time period is determined on the basis of the voltage of the battery B, the predetermined time period is set to a long time period in inverse proportion to the voltage of the battery B with reference to the standard voltage.

Moreover, when the temperature of the cooling water for cooling the engine or the ambient air is low, the temperatures of the three-way catalysts are also low at engine starting, and thus the temperatures of the three-way catalysts should be largely increased. Therefore, in the case wherein the above-mentioned predetermined time period is determined on the basis of the temperature of the cooling water or the ambient air, in particular, immediately after the engine starts, the predetermined time period is set to a short time period in proportion to the temperature of the cooling water or the ambient air.

Figure 2:
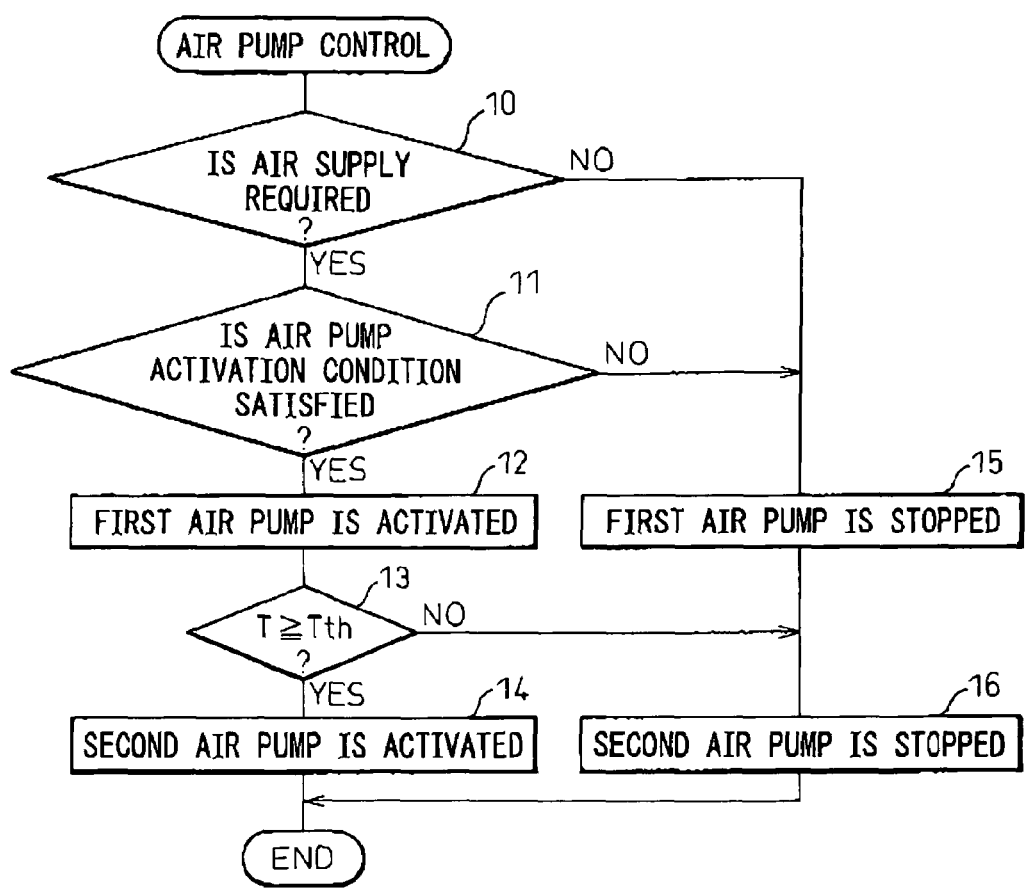
FIG. 2 is a routine for controlling the activation of air pumps according to the first embodiment.

FIG. 2 shows an example of the routine for controlling the air pumps according to the first embodiment. In the routine shown in FIG. 2, at step 10, it is judged if the air must be supplied to the three-way catalysts 8 and 9 by activating both of the air pumps P1 and P2. In this connection, for example, when the temperature of each three-way catalysts is lower than the activation temperature and the amount of the exhaust gas discharged from each cylinder is smaller than a predetermined amount, it is judged that the air must be supplied to the three-way catalysts 8 and 9. (In this connection, if the air is supplied from the air pumps to the exhaust branch pipe when the amount of the exhaust gas discharged from each cylinder is greater than the predetermined amount, the exhaust gas may flow back toward the cylinders.)

When it is judged that the air must not be supplied to the three-way catalysts 8 and 9 at step 10, the routine proceeds to step 15 where the activation of the first air pump P1 is kept stopped when it is not activated or the activation of the first air pump P1 is stopped when it is activated. Next, the routine proceeds to step 16 where the activation of the second air pump P2 is kept stopped when it is not activated or the activation of the second air pump P2 is stopped when it is activated.

On the other hand, when it is judged that the air must be supplied to the three-way catalysts 8 and 9 at step 10, the routine proceeds to step 11 where it is judged if the air pumps P1 and P2 are in a condition wherein the activation of the air pumps P1 and P2 is allowed. In particular, when the air pumps have been activated for long time, the temperatures of the air pumps are relatively high. Therefore, under the circumstances, if the air pumps are activated, they may be burned out. Further, if the air pumps are activated shortly after the activation of the air pumps is stopped, the activation and the stoppage of the air pumps are repeated in a short time interval, and thus the drivers of the air pumps are deteriorated.

Therefore, at step 11, it is judged that the air pumps P1 and P2 are in a condition wherein the activation of the air pumps P1 and P2 is allowed when the air pumps had been activated for short time, and/or when a time long enough to decrease the temperatures of the air pumps to a sufficient low temperature has elapsed after the activation of the air pumps were stopped although the air pumps had been activated for long time, and/or when a long time has elapsed after the air pumps were stopped such that the drivers of the air pumps are not deteriorated.

When it is judged that the air pumps P1 and P2 are not in a condition wherein the activation of the air pumps P1 and P2 is allowed at step 11, steps 15 and 16 are performed. On the other hand, when it is judged that the air pumps P1 and P2 are in a condition wherein the activation of the air pumps P1 and P2 is allowed, the routine proceeds to step 12 where the first air pump P1 is activated. Next, the routine proceeds to step 13.

At step 13, it is judged if the elapsed time period T after the first air pump P1 is activated has reached a predetermined time period Tth determined as explained above. When it is judged that the elapsed time period T has reached the predetermined time period Tth at step 13, the routine proceeds to step 14 where the second air pump P2 is activated. On the other hand, when it is judged that the elapsed time period T has not reached the predetermined time period Tth, step 16 is performed.

The second embodiment of the invention will be explained. In the second embodiment, when both of the air pumps P1 and P2 must be activated, first, the first air pump P1 is activated and the second air pump P2 is not activated. At this time, it is judged if the voltage of the battery B is greater than the standard voltage. When it is judged that the voltage of the battery B is greater than the standard voltage, the second air pump P2 is activated. On the other hand, when it is judged that the voltage of the battery B is smaller than the standard voltage, the activation of the air pump P2 is delayed until the voltage of the battery B becomes the standard voltage. According to the second embodiment, when both of the air pumps must be activated, the air pumps are activated at different times.

The control of the activation of the air pumps according to the second embodiment provides advantages similar to those provided by the first embodiment. Further, in the second embodiment, the time to activate the second air pump after the first air pump is activated is determined only on the basis of the voltage of the battery B which is the most important parameter to be considered. Therefore, according to the second embodiment, simple control of the air pumps can prevent the voltage of the battery from being largely decreased.

Figure 3:
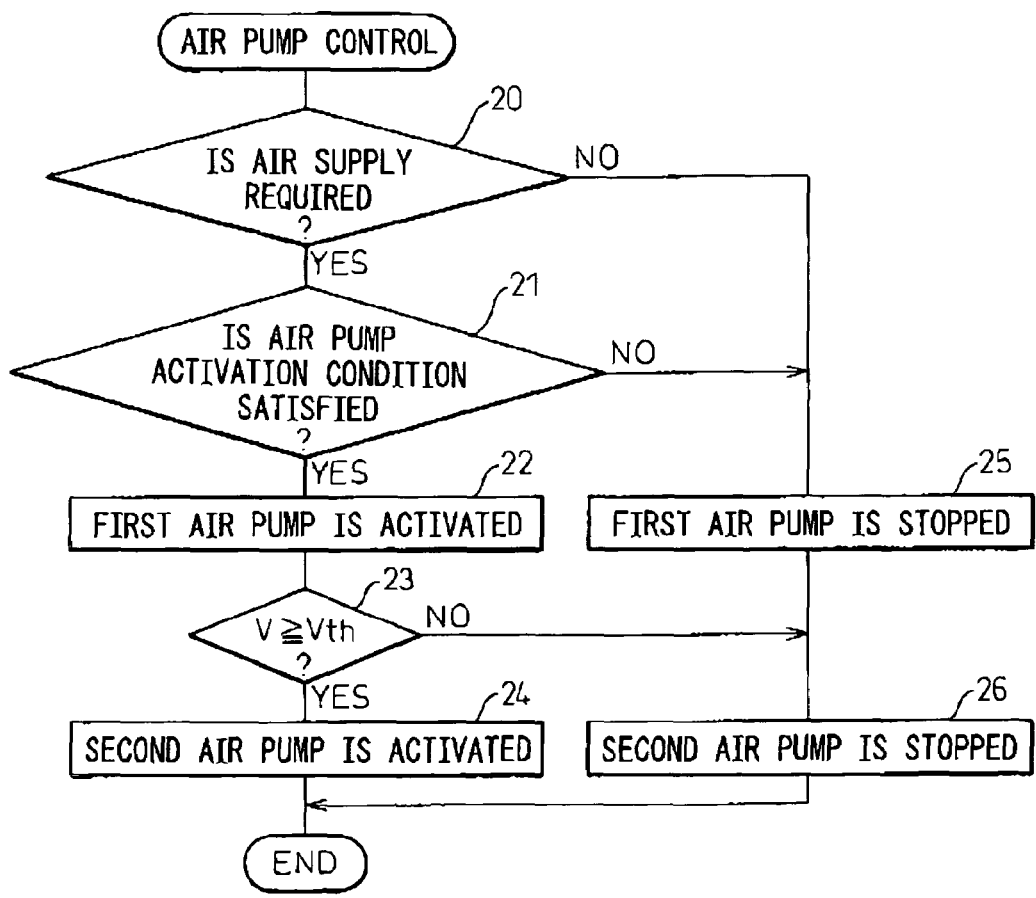
FIG. 3 is a routine for controlling the activation of air pumps according to the second embodiment.

FIG. 3 shows an example of the routine for controlling the air pumps according to the second embodiment. In the routine shown in FIG. 3, at step 20, similar to step 10 of the routine shown in FIG. 2, it is judged if the air must be supplied to the three-way catalysts 8 and 9 by activating both of the air pumps P1 and P2. When it is judged that the air must not be supplied to the three-way catalysts 8 and 9 at step 20, the routine proceeds to step 25 where the activation of the first air pump is kept stopped when it is not activated or the activation of the first air pump is stopped when it is activated. Next, the routine proceeds to step 26 where the activation of the second air pump is kept stopped when it is not activated or the activation of the second air pump is stopped when it is activated.

On the other hand, when it is judged that the air must be supplied to the three-way catalysts 8 and 9 at step 20, the routine proceeds to step 21 which is similar to step 11 of the routine shown in FIG. 2 where the air pumps P1 and P2 are in a condition wherein the activation of the air pumps P1 and P2 is allowed. When it is judged that the air pumps are not in a condition wherein the activation of the air pumps is allowed, steps 25 and 26 are performed. On the other hand, when it is judged that the air pumps are in a condition wherein the activation of the air pumps is allowed, the routine proceeds to step 22 where the first air pump P1 is activated. Next, the routine proceeds to step 23.

At step 23, it is judged if the voltage V of the battery B is greater than the standard voltage Vth. When it is judged that the voltage V of the battery B is greater than the standard voltage Vth at step 23, the routine proceeds to step 24 where the second air pump P2 is activated. On the other hand, when it is judged that the voltage V of the battery B is smaller than the standard voltage Vth, step 26 is performed.

In the above-explained embodiments, the engine has two exhaust branch pipes and two three-way catalysts arranged in the exhaust branch pipes, respectively. However, the invention can be also applied to the engine having three or more exhaust branch pipes and the corresponding number of three-way catalysts arranged in the exhaust branch pipes, respectively.

Figure 4:
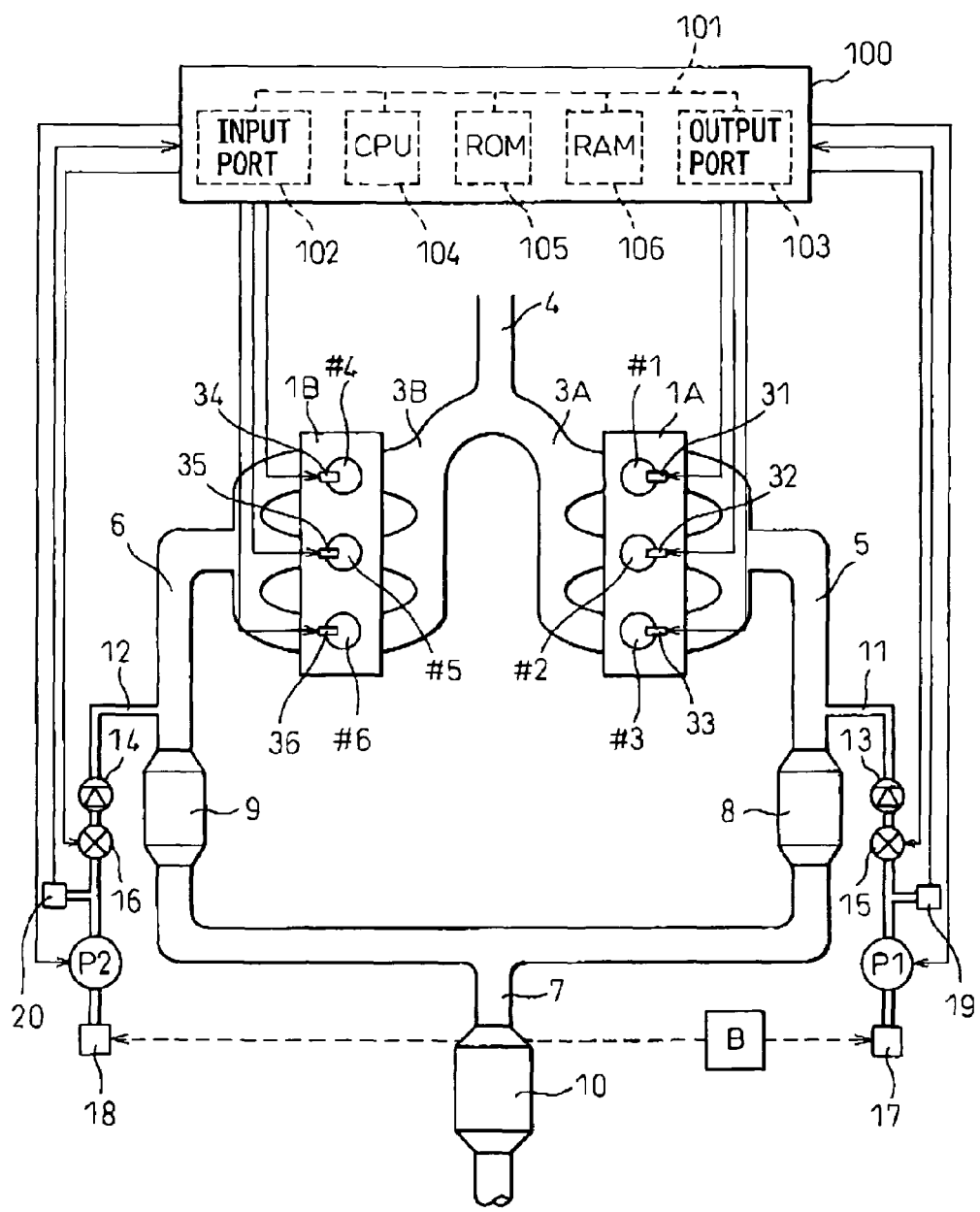
FIG. 4 is a view of an engine with an air supply apparatus of the invention.

Further, the invention can be also applied to the engine shown in FIG. 4, having a plurality of cylinder groups (two cylinder groups in the engine shown in FIG. 4) each having a plurality of cylinders (three cylinders in the engine shown in FIG. 4). The embodiment shown in FIG. 4 will be explained. In FIG. 4, 1A and 1B denote bodies of the engine, respectively and #1, #2, #3, #4, #5 and #6 denote first, second, third, fourth, fifth and sixth cylinders, respectively. Fuel injectors 31, 32, 33, 34, 35 and 36 are provided to the cylinders, respectively. The first, second and third cylinders are connected to an intake pipe 4 via intake branch pipes 3A, respectively. The fourth, fifth and sixth cylinders are connected to the intake pipe 4 via intake branch pipes 3B, respectively. Further, the first, second and third cylinders are connected to a first exhaust pipe 5. The fourth, fifth and sixth cylinders are connected to a second exhaust pipe 6. That is, when the group of the first, second and third cylinders is referred to as a—first cylinder group—and the group of the fourth, fifth and sixth cylinders is referred to as a—second cylinder group—, the first cylinder group is connected to the first exhaust branch pipe 5 and the second cylinder group is connected to the second exhaust branch pipe 6. The first and second exhaust branch pipes 5 and 6 are connected to a common exhaust pipe 7.

Three-way catalysts 8 and 9 are arranged in the exhaust branch pipes 5 and 6, respectively. A catalyst 10 for purifying specific components included in the exhaust gas is arranged in the exhaust pipe 7.

Air pipes 11 and 12 are connected to the exhaust branch pipes 5 and 6, respectively. In the direction away from the exhaust branch pipes 5 and 6, check valves 13 and 14, air flow control valves 15 and 16, air pumps P1 and P2 and air filters 17 and 18 are arranged in the air pipes 11 and 12, respectively. Pressure sensors 19 and 20 are arranged in the air pipes 11 and 12 between the air flow control valves 15 and 16 and the air pumps P1 and P2, respectively. A common battery B supplies an electrical power to the air pumps P1 and P2 to activate them.

The check valves, air flow control valves, air pumps, air filters, pressure sensors and battery of the embodiment shown in FIG. 4 are the same as those of the embodiment shown in FIG. 1. Further, the control of the activation of the air pumps of the embodiment shown in FIG. 4 is the same as that explained referring to FIGS. 1-3.

In FIG. 4, an electronic control unit (ECU) 100 comprises an input port 102, an output port 103, CPU (microprocessor) 104, ROM (read only memory) 105 and RAM (random access memory) 106, which are connected each other by a bidirectional bus 101. The pressure sensors 19 and 20 are connected to the input port 102 and the outputs of the pressure sensors 19 and 20 are input into the input port 102. The output port 103 is connected to the air flow control valves 15 and 16, fuel injectors 31-36 and the air pumps P1 and P2.

Figure 5:
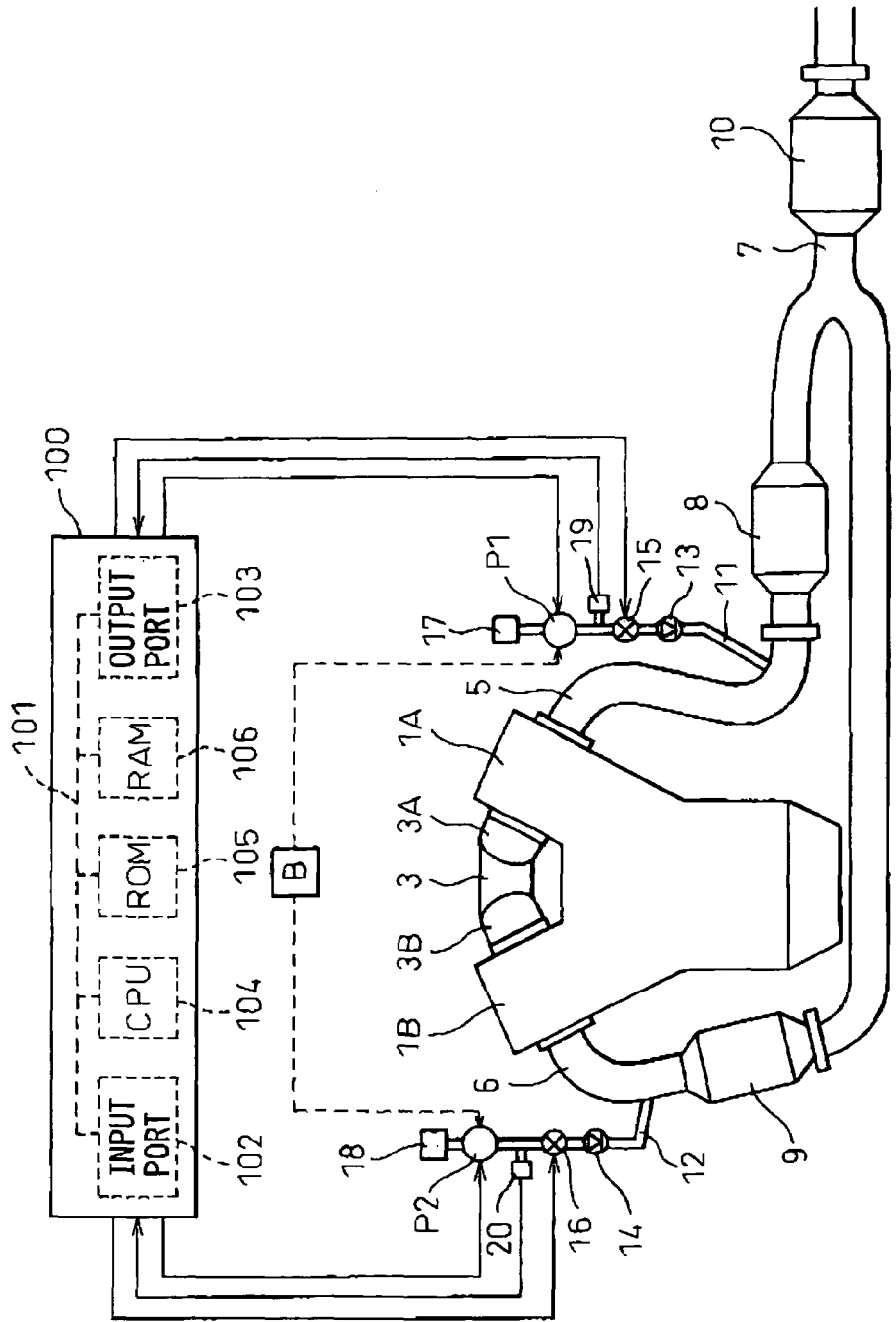
FIG. 5 is a view of a V-type engine with an air supply apparatus of the invention.

In particular, the engine shown in FIG. 4 may be a V-type engine shown in FIG. 5. The V-type engine shown in FIG. 5 comprises two banks 1A and 1B (corresponding to the engine bodies 1A and 1B of the embodiment shown in FIG. 4, respectively). The cylinder groups (corresponding to the first and second cylinder groups of the embodiment shown in FIG. 4, respectively) are provided in the banks 1A and 1B, respectively. Each cylinder group has three cylinders (corresponding to the cylinders #1-#3 and #4-#6 of the embodiment shown in FIG. 4, respectively). In the V-type engine, the banks 1A and 1B are positioned such that the center axis of the cylinders of one of the cylinder groups and the center axis of the cylinders of the other cylinder group cooperate to form "V" shape.

In case where the invention applies to the V-type engine, the air pumps are provided for the banks, respectively. Therefore, even if small air pumps are employed, the air pumps can supply the air to the three-way catalysts such that the temperatures of the three-way catalysts are increased. Further, when both of the air pumps must be activated, the air pumps are activated at different times, and thus a large decease in the voltage of the battery can be prevented.

While the invention has been described by reference to specific embodiments chosen for purposes of illustration, it should be apparent that numerous modifications could be made thereto, by those skilled in the art, without departing from the basic concept and scope of the invention.

The invention claimed is:

1. An air supply apparatus for an engine comprising a plurality of cylinder groups, each having a plurality of cylinders, a plurality of exhaust pipes connected to the cylinder groups, respectively and catalysts arranged in the exhaust pipes, respectively, the apparatus comprising devices for supplying an air into an interior of the corresponding exhaust pipes upstream of the corresponding catalysts, respectively; and electrical power is supplied to the air supply devices from a common battery, wherein each air supply device comprises at least one electrically-activated air pump, and when a plurality of the air pumps must be activated, the air pumps are activated at different times, and wherein the apparatus comprises a battery for activating the air pumps, and when a plurality of the air pumps must be activated, at least one of the air pumps is activated and when the battery supplies electrical power having a predetermined electrical voltage to the remaining air pumps after the at least one air pump is activated, the remaining air pumps are activated.

2. An air supply apparatus as set forth in claim 1, wherein the engine is a V-type engine comprising a plurality of banks, and the cylinder groups are provided in the banks, respectively.

3. An air supply apparatus as set forth in claim 1, wherein each air supply device comprises an electrically-activated air pump, an air flow control valve and a check valve, the air pumps can be independently controlled while the air flow control valves being independently controlled.

* * * * *